US010873165B2

(12) United States Patent
Komada et al.

(10) Patent No.: US 10,873,165 B2
(45) Date of Patent: Dec. 22, 2020

(54) ELECTRIC CABLE ASSEMBLY FOR HUMAN-POWERED VEHICLE

(71) Applicant: Shimano Inc., Osaka (JP)

(72) Inventors: Yasuyuki Komada, Osaka (JP); Shuhei Tahara, Osaka (JP); Eiji Mishima, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/391,672

(22) Filed: Apr. 23, 2019

(65) Prior Publication Data
US 2019/0372279 A1 Dec. 5, 2019

(30) Foreign Application Priority Data
Jun. 1, 2018 (TW) ............................. 107119064 A

(51) Int. Cl.
*H01R 24/20* (2011.01)
*H01R 4/16* (2006.01)
*H01R 4/48* (2006.01)
*H01R 13/422* (2006.01)
*H01R 13/50* (2006.01)
*H01R 103/00* (2006.01)

(52) U.S. Cl.
CPC .............. *H01R 24/20* (2013.01); *H01R 4/16* (2013.01); *H01R 4/48* (2013.01); *H01R 13/422* (2013.01); *H01R 13/50* (2013.01); *H01R 2103/00* (2013.01); *H01R 2201/26* (2013.01)

(58) Field of Classification Search
CPC . H01R 24/20; H01R 4/16; H01R 4/48; H01R 13/422; H01R 13/50; H01R 13/52

USPC ...................................... 439/660, 877, 733.1
See application file for complete search history.

(56) References Cited

U.S. PATENT DOCUMENTS

| | | | | |
|---|---|---|---|---|
| 5,580,264 | A * | 12/1996 | Aoyama | H01R 13/5208 439/275 |
| 6,220,880 | B1 | 4/2001 | Lee et al. | |
| 6,489,563 | B1 * | 12/2002 | Zhao | H01R 9/0524 174/880 |
| 7,422,463 | B2 * | 9/2008 | Kuo | H01R 13/5205 439/277 |
| 7,540,773 | B2 | 6/2009 | Ko | |
| 7,837,516 | B2 * | 11/2010 | Ko | H01R 24/52 439/701 |
| 8,113,889 | B2 * | 2/2012 | Zhang | H01R 43/24 439/606 |
| 8,317,540 | B2 * | 11/2012 | Chen | H01R 9/0518 439/582 |

(Continued)

FOREIGN PATENT DOCUMENTS

| | | |
|---|---|---|
| AT | 504 142 A4 | 3/2008 |
| DE | 196 30 202 A1 | 1/1998 |
| DE | 10 2014 000 520 A1 | 7/2015 |

*Primary Examiner* — Peter G Leigh
(74) *Attorney, Agent, or Firm* — Global IP Counselors, LLP

(57) ABSTRACT

An electric cable assembly is provided for a human-powered vehicle. The electric cable assembly includes an electric cable, a connector, a coupling member and a molded part. The electric cable includes at least a wire extending from an insulated portion. The coupling member electrically couples the wire to the connector. The molded part integrally accommodates at least part of the insulated portion, at least part of the connector, and the coupling member.

20 Claims, 10 Drawing Sheets

(56) References Cited

U.S. PATENT DOCUMENTS

| | | | |
|---|---|---|---|
| 8,979,549 B2* | 3/2015 | Lin | H01R 13/46 |
| | | | 439/31 |
| 9,385,466 B2* | 7/2016 | Henry | H01R 13/506 |
| 9,948,048 B2* | 4/2018 | Ng | H01R 31/02 |
| 2001/0055920 A1 | 12/2001 | McCoy | |
| 2005/0281009 A1* | 12/2005 | Sasaki | B60R 16/0239 |
| | | | 361/752 |
| 2006/0110978 A1* | 5/2006 | Fan | H01R 13/514 |
| | | | 439/607.01 |
| 2006/0178046 A1 | 8/2006 | Tusini | |
| 2006/0272150 A1* | 12/2006 | Eguchi | H05K 5/0082 |
| | | | 29/841 |
| 2007/0026728 A1 | 2/2007 | Mak | |
| 2010/0120294 A1* | 5/2010 | Ko | H01R 24/52 |
| | | | 439/660 |
| 2011/0014821 A1* | 1/2011 | Ko | H01R 9/03 |
| | | | 439/733.1 |
| 2011/0045697 A1* | 2/2011 | Sawamura | B60R 16/0207 |
| | | | 439/587 |
| 2014/0295710 A1* | 10/2014 | Inagaki | H01R 13/5216 |
| | | | 439/660 |
| 2015/0104967 A1* | 4/2015 | Jaan | H01R 13/6275 |
| | | | 439/352 |
| 2016/0254615 A1* | 9/2016 | Sugita | H01R 13/5845 |
| | | | 439/606 |
| 2017/0295306 A1* | 10/2017 | Mleczko | B29C 45/1615 |
| 2017/0324235 A1 | 11/2017 | Tachi et al. | |
| 2018/0069350 A1* | 3/2018 | Miyoshi | H01R 13/648 |

* cited by examiner

ELECTRIC CABLE ASSEMBLY FOR HUMAN-POWERED VEHICLE

CROSS-REFERENCE TO RELATED APPLICATIONS

This application claims priority to Taiwanese Patent Application No. 107119064, filed on Jun. 1, 2018. The entire disclosure of Taiwanese Patent Application No. 107119064 is hereby incorporated herein by reference.

BACKGROUND

Technical Field

The present invention generally relates to an electric cable assembly for a human-powered vehicle. In particular, the present invention relates to an electric cable for bicycle.

Background Information

Bicycling is becoming an increasingly more popular form of recreation as well as a means of transportation. Moreover, bicycling has become a very popular competitive sport for both amateurs and professionals. Whether bicycles are used for recreation, transportation or competition, the bicycle industry is constantly improving the various components of bicycles. One component that has been recently redesigned is an electrical cable assembly. The electrical cable assembly is configured to connect at least one electric component. However, the conventional design of electrical cable assemblies is so complicated that it takes a great amount of time and money to manufacture and assemble them. In addition, the waterproof and protective capabilities of electrical cable assemblies are also a concern for users.

SUMMARY

In accordance with a first aspect of the present invention, an electric cable assembly is provided for human-powered vehicle. The electric cable assembly comprises an electric cable including at least a wire extending from an insulated portion, a connector, a coupling member electrically coupling the wire to the connector, and a molded part integrally accommodating at least part of the insulated portion, at least part of the connector, and the coupling member.

With the electric cable assembly according to the first aspect, it is possible to reduce the manufacturing time and cost given that the structure of the electric cable assembly is simple, and the connector and the electric cable can be coupled with each other through the coupling member.

In accordance with a second aspect of the present disclosure, the electric cable assembly according to the first aspect is configured so that the coupling member includes a coupling portion. The coupling portion has a receiving part that receives the wire and an additional receiving part that receives the connector. The additional receiving part is spaced apart from the receiving part.

With the electric cable assembly according to the second aspect, it is possible to easily obtain and arrange the coupling between the connector and the coupling portion, and the coupling between the wire and the coupling portion given that the receiving part is spaced apart from the additional receiving part.

In accordance with a third aspect of the present disclosure, the electric cable assembly according to the first aspect or the second aspect is configured so that the electric cable further includes an additional wire extending from the insulated portion.

With the electric cable assembly according to the third aspect, it is possible to separately connect two wires with an electric component through the electric cable assembly.

In accordance with a fourth aspect of the present disclosure, the electric cable assembly according to the third aspect is configured so that the coupling member further includes an additional coupling portion spaced apart from the coupling portion. The additional coupling portion has a receiving part that receives the additional wire and an additional receiving part that receives the connector. The additional receiving part is spaced apart from the receiving part.

With the electric cable assembly according to the fourth aspect, it is possible to connect two wires with an electric component respectively through the receiving part and the additional receiving part that are spaced apart from each other.

In accordance with a fifth aspect of the present disclosure, the electric cable assembly according to the fourth aspect is configured so that the connector includes a pair of legs, the additional receiving part of the coupling portion receives one of the pair of legs, and the additional receiving part of the additional coupling portion receives the other of the pair of legs.

With the electric cable assembly according to the fifth aspect, it is possible to easily obtain the two couplings between two parts of the connector and two parts of the coupling member by inserting the pair of legs into the receiving part and the additional receiving part, respectively.

In accordance with a sixth aspect of the present disclosure, the electric cable assembly according to any one of the first to fifth aspects further comprises an additional connector. The coupling member electrically couples the wire to the additional connector. The molded part integrally accommodates at least part of the additional connector.

With the electric cable assembly according to the sixth aspect, it is possible to simultaneously connect the wire with the connector and the additional connector.

In accordance with a seventh aspect of the present disclosure, the electrical cable assembly according to the sixth aspect is configured so that the coupling member includes a coupling portion. The coupling portion has a receiving part that receives the wire and an additional receiving part that receives the additional connector. The additional receiving part is spaced apart from the receiving part.

With the electric cable assembly according to the seventh aspect, it is possible to easily obtain and arrange the coupling between the additional connector and the coupling portion and the coupling between the wire and the coupling portion given that the receiving part is spaced apart from the additional receiving part.

In accordance with an eighth aspect of the present disclosure, the electrical cable assembly according to the seventh aspect is configured so that the electric cable further includes an additional wire extending from the insulated portion.

With the electric cable assembly according to the eighth aspect, it is possible to separately connect two wires with one or two electric components through the electric cable assembly.

In accordance with a ninth aspect of the present disclosure, the electrical cable assembly according to the eighth aspect is configured so that the coupling member further includes an additional coupling portion spaced apart from the coupling portion. The additional coupling portion has a receiving part that receives the additional wire and an additional receiving part that receives the additional connector, the additional receiving part being spaced apart from the receiving part.

With the electric cable assembly according to the ninth aspect, it is possible to easily arrange the coupling between the additional connector and the additional coupling portion and the coupling between the additional wire and the additional coupling portion given that the receiving part of the additional coupling portion apart is spaced apart from the additional receiving part of the additional coupling portion.

In accordance with a tenth aspect of the present disclosure, the electrical cable assembly according to the ninth aspect is configured so that the additional connector includes a pair of legs, the additional receiving part of the coupling portion receives one of the pair of legs, and the additional receiving part of the additional coupling portion receives the other of the pair of legs.

With the electric cable assembly according to the tenth aspect, it is possible to easily obtain the two couplings between two parts of the additional connector and two parts of the coupling member by inserting the pair of legs into the receiving part and the additional receiving part, respectively.

In accordance with an eleventh aspect of the present disclosure, the electric cable assembly according to any one of the first to tenth aspects further comprises a holder that positions an end portion of the insulated portion with respect to the molded part.

With the electric cable assembly according to the eleventh aspect, it is possible to fix the electric cable to the molded part and prevent dust and liquid from entering the interior of the electric cable assembly.

In accordance with a twelfth aspect of the present disclosure, the electric cable assembly according to the eleventh aspect is configured so that the holder includes a cover member that covers the end portion of the insulated portion.

With the electric cable assembly according to the twelfth aspect, it is possible to protect the wire from exposure to the outside.

In accordance with a thirteenth aspect of the present disclosure, the electric cable assembly according to the twelfth aspect is configured so that the holder further includes a positioning member that positions the cover member with respect to the end portion of the insulated portion.

With the electric cable assembly according to the thirteenth aspect, it is possible to fix the cover member to the cable and improve the waterproof capability of the electric cable assembly at the end portion of the insulated portion.

In accordance with a fourteenth aspect of the present disclosure, the electric cable assembly according to the thirteenth aspect is configured so that the positioning member is fixedly disposed on an outer circumferential surface of the insulated portion.

With the electric cable assembly according to the fourteenth aspect, it is possible to further fix the cover member to the cable and improve the waterproof capability of the electric cable assembly at the end portion of the insulated portion.

In accordance with a fifteenth aspect of the present disclosure, the electric cable assembly according to any one of the twelfth to fourteenth aspects is configured so that the cover member includes an annular portion and a tapered portion extending from one end of the annular portion towards the molded part.

With the electric cable assembly according to the fifteenth aspect, it is possible to further fix the cover member to the cable and improve the waterproof capability of the electric cable assembly at the end portion of the insulated portion.

In accordance with a sixteenth aspect of the present disclosure, the electric cable assembly according to any one of the twelfth to fifteenth aspects is configured so that the tapered portion includes at least a protrusion disposed on at least a coupling portion.

With the electric cable assembly according to the sixteenth aspect, it is possible to position and hold the coupling portion to be relatively separate from the additional coupling portion.

In accordance with a seventeenth aspect of the present disclosure, the electric cable assembly according to the fifteenth aspect is configured so that the tapered portion is configured to be accommodated in the molded part.

With the electric cable assembly according to the seventeenth aspect, it is possible to further fix the cover member to the cable and improve the waterproof capability of the electric cable assembly at the end portion of the insulated portion.

In accordance with an eighteenth aspect of the present disclosure, the electric cable assembly according to any one of the first to seventeenth aspects is configured so that the molded part includes a recess that arranges a part of the connector such that the connector is electrically connected to an electric component.

With the electric cable assembly according to the eighteenth aspect, it is possible to expose the part of the connector in a direction to connect the electric component so as to protecting the connector from damage given that the connector is located in the recess of the molded part.

In accordance with a nineteenth aspect of the present disclosure, the electric cable assembly according to any one of the first to eighteenth aspects is configured so that the molded part is a low pressure molded part.

With the electric cable assembly according to the nineteenth aspect, it is possible to simplify the manufacturing of the molded part.

In accordance with a twentieth aspect of the present disclosure, the electric cable assembly according to any one of the first to nineteenth aspects is configured so that the molded part is made of an insulating material.

With the electric cable assembly according to the twentieth aspect, it is possible to have at least part of the insulated portion, at least part of the connector, and the coupling member that integrally accommodated by the molded part electrically insulated from the outside.

In accordance with a twenty-first aspect of the present disclosure, an electric cable assembly is provided for human-powered vehicle. The electric cable assembly comprises an electric cable including at least a wire extending from an insulated portion, a connector, an additional connector, and a molded part integrally accommodating at least part of the insulated portion, at least part of the connector and at least part of the additional connector, such that the connector and additional connector are electrically coupled to the wire in the molded part.

With the electric cable assembly according to the twenty-first aspect, it is possible to reduce manufacturing time and cost given that the structure of the electric cable assembly is simple, and the connectors and the at least one wire can be coupled in the molded part.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the present invention as defined by the appended claims and their equivalents.

First Embodiment

Figure 1A:
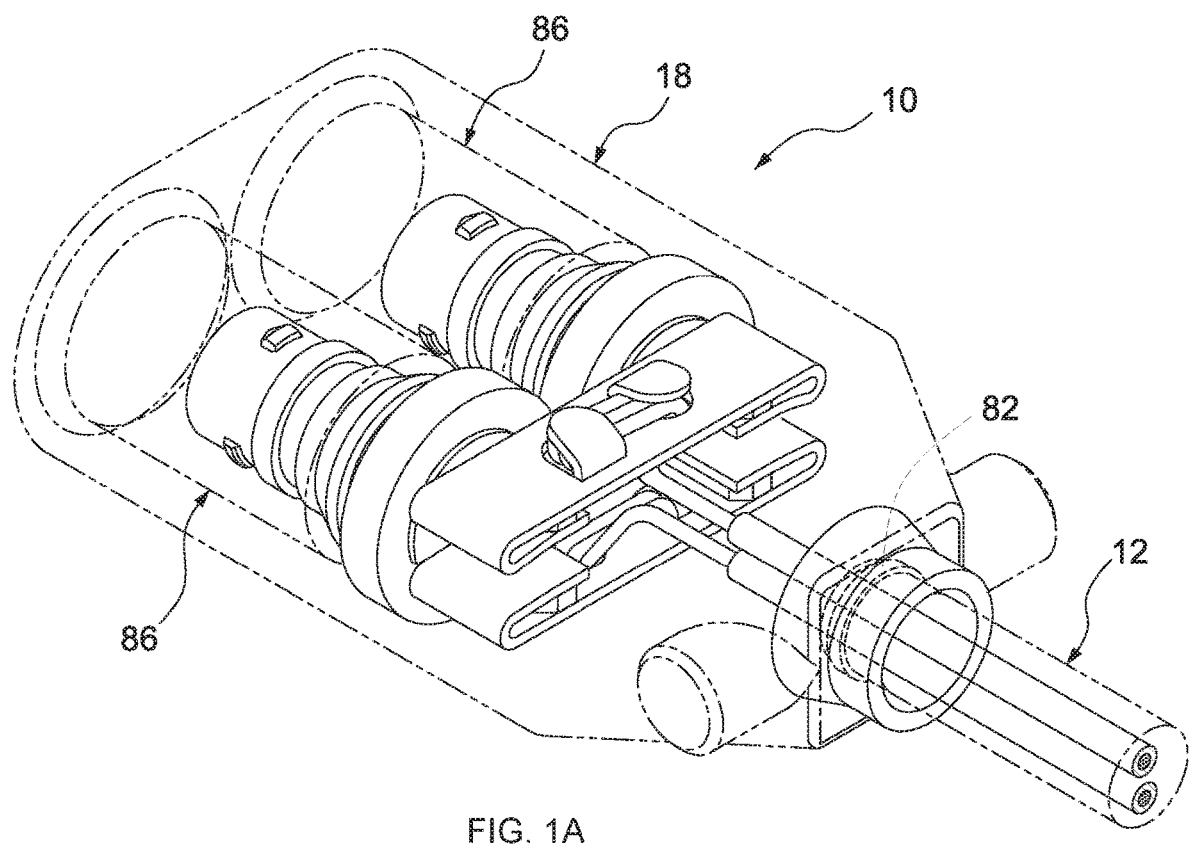
FIG. 1A is a perspective view of an electric cable assembly for a human-powered vehicle in accordance with a first embodiment.
Figure 1B:
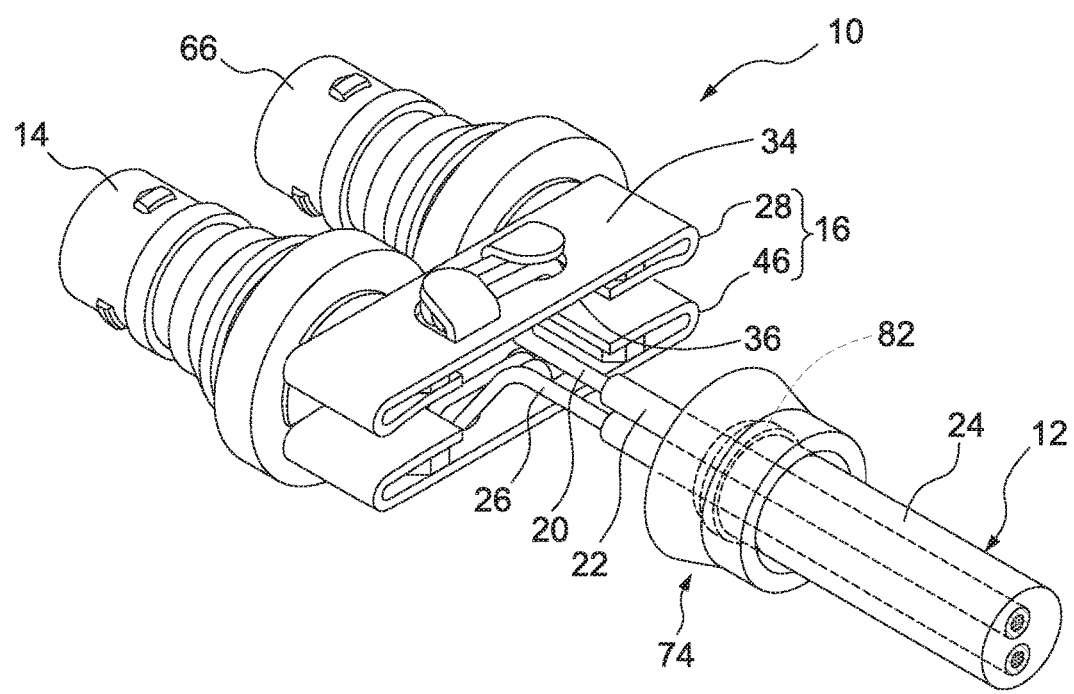
FIG. 1B is a perspective view of the electric cable assembly of FIG. 1A in which a molded part is omitted.
Figure 1C:
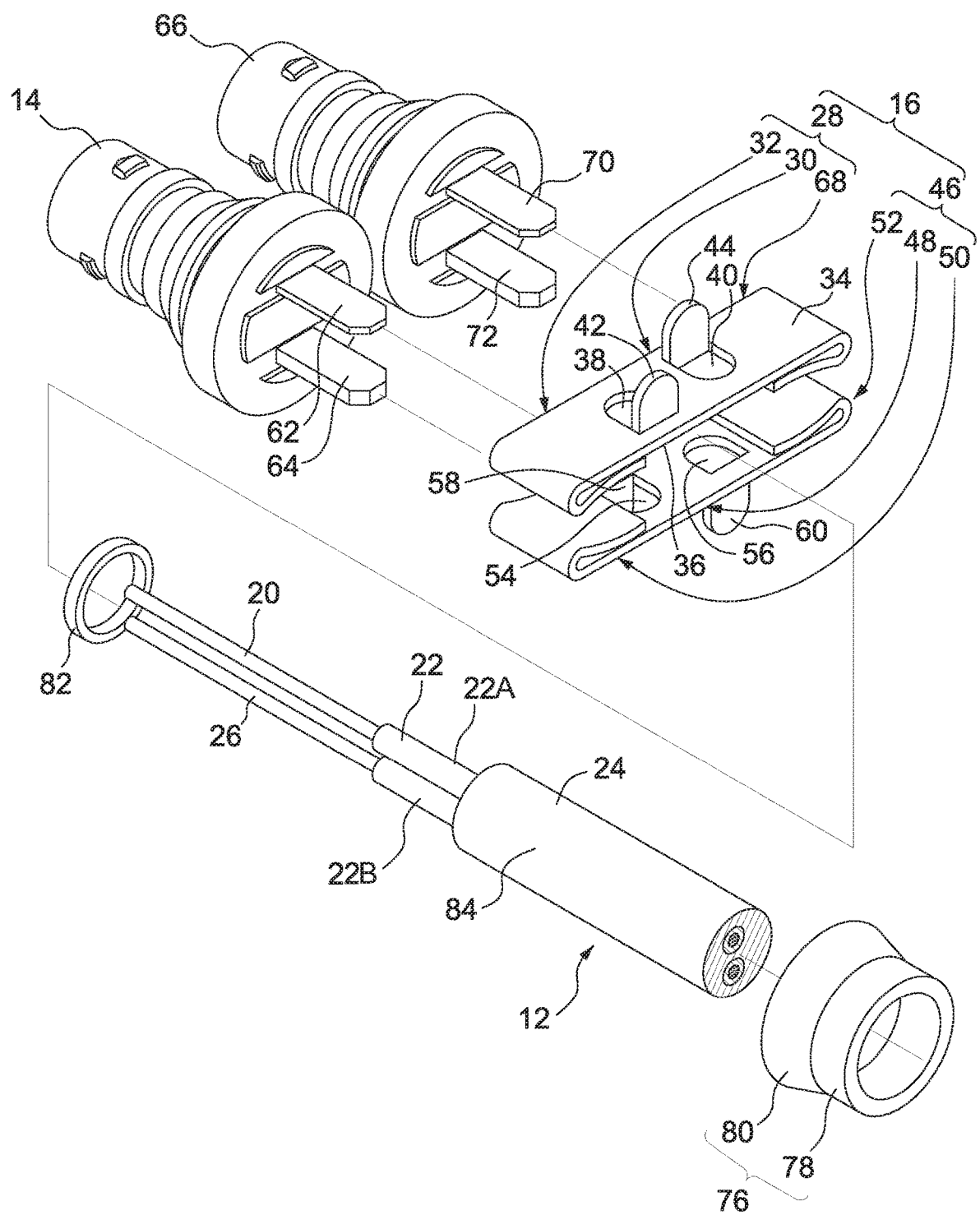
FIG. 1C is an exploded view of the electric cable assembly of FIG. 1B.

Referring initially to FIGS. 1A, 1B and 1C, an electric cable assembly 10 is provided for a human-powered vehicle. The human-powered vehicle is, for example, a bicycle. The electric cable assembly 10 can be configured to connect at least one electric component located on the human-powered vehicle. The electric component can be, for example, a battery, an electrical motor assembly, a video camera, a mobile device, a display device, or a charger.

In this embodiment, the electric cable assembly 10 comprises an electric cable 12, a connector 14, a coupling member 16 and a molded part 18. The electric cable 12 includes at least a wire 20 and an insulated portion 22. The wire 20 extends from a first receptacle 22A of the insulated portion 22, which is made from an electrically insulated material. The coupling member 16 electrically couples the wire 20 to the connector 14. The molded part 18 integrally accommodates at least part of the insulated portion 22, at least part of the connector 14, and the coupling member 16.

As shown in FIGS. 1B and 1C, the electric cable 12 further includes a sheath 24. Further, the electric cable 12 includes an additional wire 26 extending from a second receptacle 22B of the insulated portion 22. The sheath 24 covers the insulated portion 22, the wire 20 and the additional wire 26. In this embodiment, the insulated portion 22 surrounds most parts of the wire 20 and the additional wire 26, and the distal ends of the wire 20 and the additional wire 26 are not covered by the insulated portion 22 such that the distal ends of the wire 20 and the additional wire 26 are exposed from the insulated portion 22.

In this embodiment, the coupling member 16 includes a coupling portion 28. The coupling portion 28 has a receiving part 30 and an additional receiving part 32 (see FIG. 1C). The receiving part 30 receives the wire 20. The additional receiving part 32 receives the connector 14. The additional receiving part 32 is spaced apart from the receiving part 30 at a predetermined distance.

Further, as shown in FIG. 1C, the coupling portion 28 is in the shape of a substantially elongated flat body and has a first surface 34 and a second surface 36 that is opposite the first surface 34. The coupling portion 28 is made of a conductive material for transmitting electricity and/or signals. The receiving part 30 is provided on the coupling portion 28 at a predetermined position. The receiving part 30 has two apertures 38, 40 penetrating through the first surface 34 and the second surface 36. The wire 20, extending from the insulated portion 22, can be wound onto the receiving part 30 through the two apertures 38, 40 such that the wire 20 is coupled with the receiving part 30. In addition, the receiving part 30 includes two holding portions 42, 44, each protruding from the periphery of the two apertures 38, 40 on the first surface 34. One of the holding portions 42 is located closer to the electric cable 12, and the other holding portion 44 is located closer to the connector 14. The holding portions 42, 44 can be pressed towards the first surface 34 so as to position and hold the wire 20 after the wire 20 is wound onto the two apertures 38, 40. In this embodiment, the shape of the two holding portions 42, 44 correspond to those of the two apertures 38, 40, and the two holding portions 42, 44 and the two apertures 38, 40 are formed by pressing. However, the method of forming the two holding portions 42, 44 and the two apertures 38, 40 is not limited to pressing in this embodiment.

In this embodiment, the additional receiving part 32 is spaced apart from the receiving part 30 at a predetermined position and has an end of the coupling portion 28 facing inwardly towards the receiving part 30 in a U-shaped structure. The connector 14 is coupled to the U-shaped structure of the additional receiving part 32. However, the additional receiving part 32 is not limited to this embodiment.

As seen in FIG. 1C, the coupling member 16 further includes an additional coupling portion 46 spaced apart from the coupling portion 28. The additional coupling portion 46 has a receiving part 48 that receives the additional wire 26 and an additional receiving part 50 that receives the connector 14. The additional receiving part 50 is spaced apart from the receiving part 48 at a predetermined position. The additional coupling portion 46 is made of a conductive material for transmitting electricity and/or signal. In this embodiment, the structure of the additional coupling portion 46 is similar to that of the coupling portion 28 and is also in the shape of a substantially elongated flat body. Thus, the additional coupling portion 46 also has a first surface 34 and a second surface 36. The second surface 36 is opposite the first surface 34 of the additional coupling portion 46 and faces the second surface 36 of the coupling portion 28. The receiving part 48 of the additional coupling portion 46 further includes two apertures 54, 56 and two holding portions 58, 60. The additional wire 26 is wound onto the receiving part 48 through the two apertures 54, 56. The two holding portions 58, 60 protrude from the additional coupling portion 46 and can be pressed towards the receiving part 48 to position and hold the additional wire 26.

The connector 14 includes a pair of legs 62, 64. The additional receiving part 32 of the coupling portion 28 receives one (the leg 62) of the pair of legs 62, 64. The additional receiving part 50 of the additional coupling portion 46 receives the other (the leg 64) of the pair of legs 62, 64. In this embodiment, the additional receiving parts 32, 50 of the coupling portion 28 and the additional coupling portion 46 are configured to have a U-shaped structure such that the legs 62, 64 can be received in the U-shaped structure, thereby further ensuring the electrical connection between the connector 14 and the coupling member 16.

In this embodiment, the electric cable assembly 10 further comprises an additional connector 66. The coupling member 16 is further electrically couples the wire 20 to the additional connector 66. The molded part 18 integrally accommodates at least part of the additional connector 66. Specifically, in this embodiment, the coupling member 16 includes the coupling portion 28. The coupling portion 28 has the receiving part 30 and two additional receiving parts 32, 68. The receiving part 30 receives the wire 20. One of the additional receiving parts 32 receives the connector 14, and the other additional receiving part 68 receives the additional connector 66. The two additional receiving parts 32, 68 are spaced apart from the receiving part 30 at a predetermined position. Moreover, the receiving part 30 is located between the two additional receiving parts 32, 68.

The additional coupling portion 46 that is spaced apart from the coupling portion 28, further has an additional receiving part 52 receives the additional connector 66. The two additional receiving parts 50, 52 are spaced apart from the receiving part 48 at a predetermined position. Also, the receiving part 48 is located between the two additional receiving parts 50, 52.

The additional connector 66 includes a pair of legs 70, 72. The additional receiving part 68 of the coupling portion 28 receives one (the leg 70) of the pair of legs 70, 72. The additional receiving part 52 of the additional coupling portion 46 receives the other (the leg 72) of the pair of legs 70, 72. In this embodiment, each leg 70, 72 has a different structure, more specifically, a different thickness in accordance to positive or negative terminal.

The wire 20 is electrically coupled with the leg 62 of the connector 14 and the leg 70 of the additional connector 66 through the additional receiving parts 32, 68 of the coupling portion 28. The additional wire 26 is electrically coupled with the leg 64 of the connector 14 and the leg 72 of the additional connector 66 through the additional receiving parts 50, 52 of the additional coupling portion 46.

As seen in FIG. 1B, in this embodiment, the electric cable assembly 10 further comprises a holder 74 that positions an end portion of the insulated portion 22 with respect to the molded part 18. As shown in FIG. 1C, the holder 74 includes a cover member 76 that covers the end portion of the insulated portion 22. The cover member 76 includes an annular portion 78 and a tapered portion 80 extending from one end of the annular portion 78 towards the molded part 18 with the radius of the tapered portion 80 being increased accordingly. The tapered portion 80 is configured to be accommodated in the molded part 18. As shown in FIG. 1A to FIG. 1C, the holder 74 further includes a positioning member 82 that positions the cover member 76 with respect to the end portion of the insulated portion 22. However, the structure of the holder 74 is not limited to the structure illustrated in FIG. 1A to FIG. 1C. It will be apparent to those skilled in the art that different shapes of holder 74 can be utilized as needed and/or desired. On the other hand, the positioning member 82 is fixedly disposed on an outer circumferential surface 84 of the insulated portion 22. Preferably, the positioning member 82 is fixedly disposed on the sheath 24 surrounding the outer circumferential surface 84 of the insulated portion 22. In this embodiment, the positioning member 82 is an O-ring. The O-ring can be made of metal, rubber or plastic. Furthermore, an adhesive can be selectively applied to the positioning member 82 to enhance the fixation of the positioning member 82. In another embodiment, the positioning member can also be an adhesive.

As shown in FIG. 1A, the molded part 18 includes at least one recess 86 that arranges a part of the connector 14 such that the connector 14 is electrically connected to an electric component. In this embodiment, the molded part comprises two recesses 86 that are configured to respectively accommodate parts of the connector 14 and the additional connector 66, i.e., receptacles of the connector 14 and the additional connector 66.

The following describes the steps of assembling and manufacturing the electric cable assembly 10. First, the distal ends of the sheath 24 and the insulated portion 22 of the electric cable 12 are removed to expose the wire 20 and the additional wire 26. For example, the sheath 24 and the insulated portion 22 can be removed by being peeled off. The wire 20 and the additional wire 26 are coupled with the coupling member 16, and the connector 14 and the additional connector 66 are coupled with the coupling member 16. These two steps can be performed simultaneously or performed one after the other. However, the assembling and manufacturing process is not limited to the order of these two steps. Specifically, the wire 20 and the additional wire 26 can be coupled with the coupling member 16 before or after the step of coupling the connector 14 and the additional connector 66 with the coupling member 16.

The holder 74 is provided to the end of the insulated portion 22 before, after or at the same time when the electric cable 12, the coupling member 16, the connector 14 and the additional connector 66 are assembled together. In this embodiment, the positioning member 82 is provided to surround the outer circumferential surface 84 of the insulated portion 22. Preferably, the positioning member 82 is disposed on the sheath 24 surrounding the outer circumferential surface of the insulated portion 22. The cover member 76 is provided to enclose the positioning member 82 and the end portion of the insulated portion 22. More specifically, the cover member 76 includes the annular portion 78 and the tapered portion 80. The annular portion 78 is provided to surround the positioning member 82 and the end of the insulated portion 22. And the tapered portion 80 extending from the end of the annular portion 78 is located between the coupling member 16 and the annular portion 78.

Figure 1D:
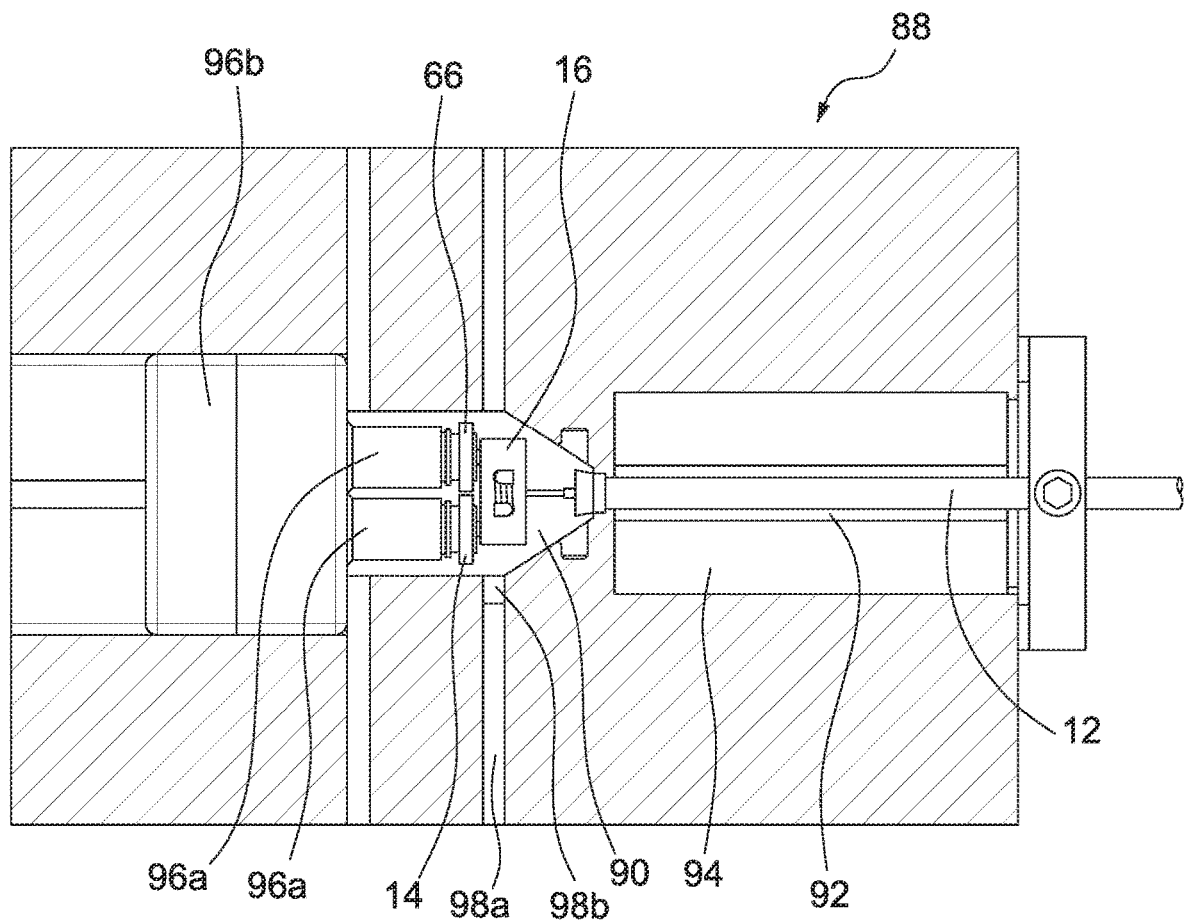
FIG. 1D is a top view showing an electric cable, a connector, an additional connector, a coupling member and a holder of the electric cable assembly in accordance with the first embodiment, which is located in a molding device during a manufacturing process.

As shown in FIG. 1D, the assembled part comprising the electric cable 12, the coupling member 16, the connector 14 and the additional connector 66 is arranged in a molding device 88 without being encapsulated in a supporting case. In this embodiment, the coupling member 16, the connector 14 and the additional connector 66 are disposed into a mold cavity 90 of the molding device 88. However, the mold cavity 90 is not limited to the shape in FIG. 1D, and it will be apparent to those skilled in the art that different shapes of mold cavities can be utilized as needed and/or desired. The electric cable 12 is disposed into a groove 92 that is surrounded by a heat insulation cover 94 for protecting the electric cable 12 from the heat released during the molding process. Moreover, two cylindrical shields 96a cover parts of the connector 14 and the additional connector 66, respectively. A movable member 96b is configured to movably position the two cylindrical shields 96a.

In this embodiment, an insulating material is provided through a conduit 98a and a gate 98b into the mold cavity 90 so as to form the molded part 18. The insulating material can be molding resin, preferably epoxy-based resin. Alternatively, the insulating material can be polyester- or polyamide-based resin, PBT (polybutylene terephthalate) resin, or the like. The molded part 18 is formed by low pressure molding such that the molded part 18 is a low pressure molded part. In this embodiment, after the insulating material flows into the mold cavity 90, the insulating material is cured under a low pressure to become solid. For example, the temperature can be 135° C. to 145° C., preferably 140° C. The pressure can be 1.0 MPa to 2.0 MPa, preferably 1.5 MPa, and the heating period can be 3 minutes to 10 minutes, preferably 5 minutes to 6 minutes. The movable members 96b are retracted, and the two cylindrical shields 96a are taken out of the mold cavity 90 after the molded part 18 is formed. Note that the two cylindrical shields 96a cover the parts of the connector 14 and the additional connector 66, the two cylindrical shields 96a prevent the insulating material from flowing to the parts of the connector 14 and the additional connector 66. Therefore, two recesses 86 are formed inside the original positions of the two cylindrical shields 96a. Moreover, the molded part 18 covers the tapered portion 80, and at least a part of the annular portion 78 exposes to the outside. Since the tapered portion 80 expands towards the coupling portion 28, the tapered portion 80 is configured to be fixed and secured within the molded part 18. In this embodiment, the molded part 18 is made of an insulating material, and thus the molded part 18 can protect the coupling member 16, the connector 14 and the additional connector 66 from physical damage, outside disturbance and outside impact.

The heat insulation cover 94 surrounding the electric cable 12 is configured to protect the electric cable 12 from melting down due to the heat released during the molding process. However, in another embodiment, a sheath 24 with better thermal resistance is provided to protect the inside of the electric cable 12 such that the heat insulation cover 94 is not necessarily required.

In this embodiment, it will be appreciated that the molding process refers to a potting-less process, in which the molding process does not require a supporting case in the process to form a certain component. In contrast, a potting process requires an encapsulated or potting compound to protect the product including electrical insulation, environmental protection from moisture, water and chemicals and mechanical attack from thermal shock and vibration. Without any encapsulate or potting compound, the molded part 18 formed by the potting-less process with low pressure can still provide protection that allows the electric cable assembly 10 to be used in many more applications ensuring reliable, long-term performance. However, the method of manufacturing the electrical cable is not limited to this embodiment, and it will be apparent to those skilled in the art that different steps or processes can be applied as needed and/or desired.

Based on the above, the same process can be used to assemble and manufacture different embodiments of the electric cable assembly. More specifically, the electric cable assembly 10 is provided for a human-powered vehicle in which the electric cable assembly 10 basically comprises the electric cable 12, the connector 14, the additional connector 66 and the molded part 18. The electric cable 12 includes at least the wire 20 extending from the insulated portion 22. The molded part 18 integrally accommodates at least part of the insulated portion 22, at least part of the connector 14 and at least part of the additional connector 66, such that the connector 14 and the additional connector 66 are electrically coupled to the wire 20 in the molded part 18.

Second Embodiment

Figure 2A:
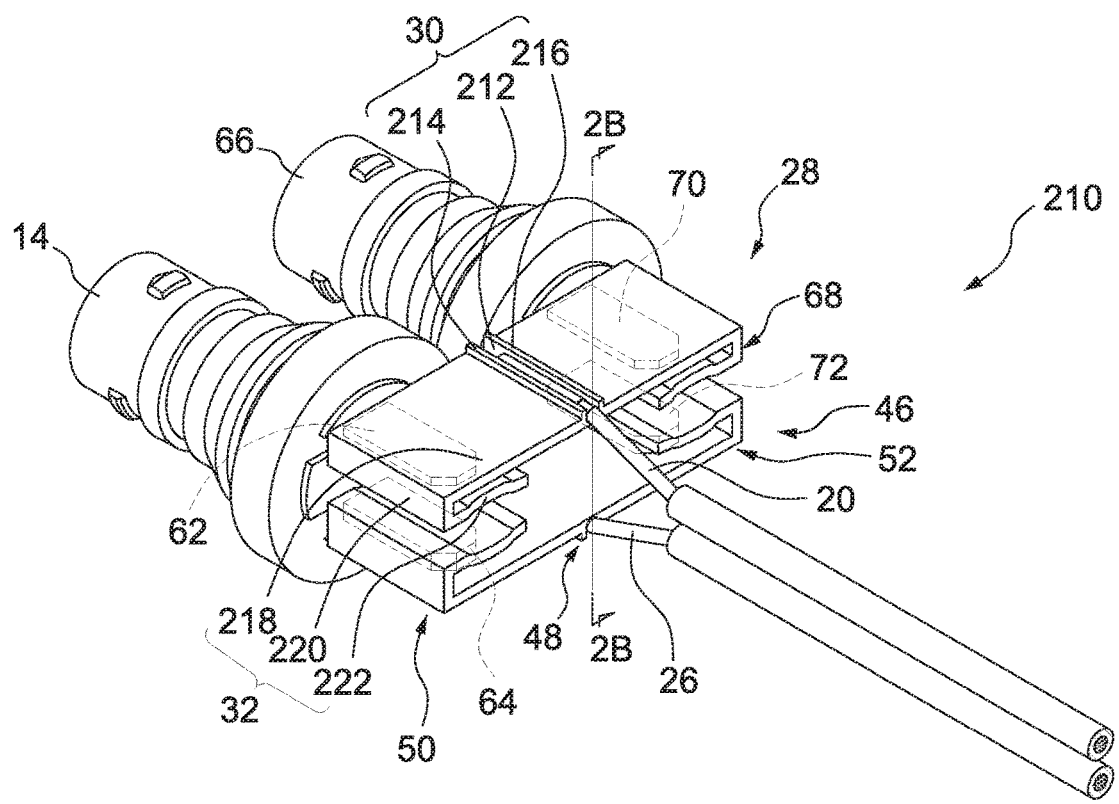
FIG. 2A is a perspective view of an electric cable assembly for a human-powered vehicle in accordance with a second embodiment in which a molded part is omitted.
Figure 2B:
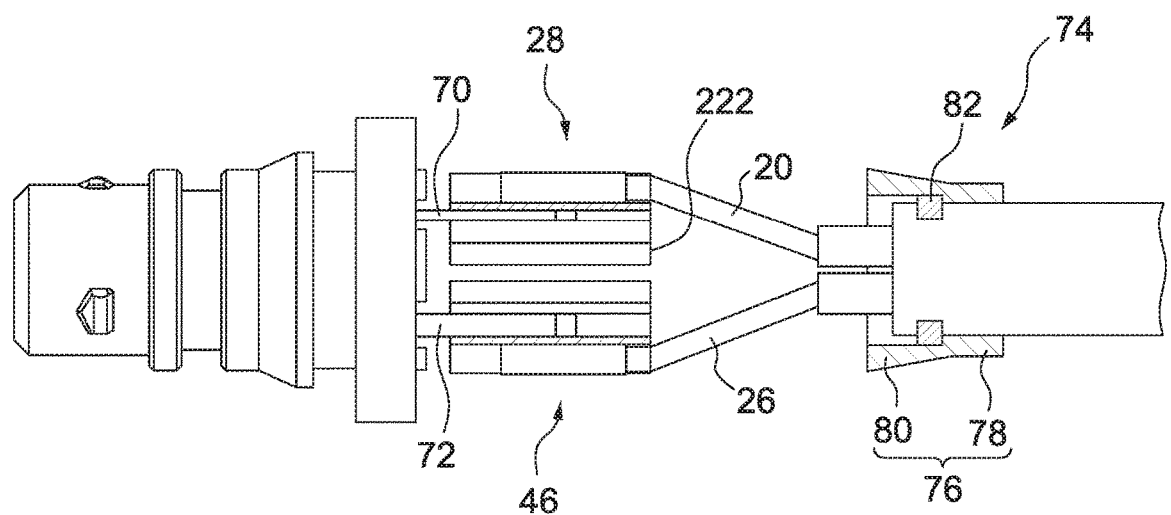
FIG. 2B is a cross-sectional view of the electric cable assembly taken along line 2B-2B in FIG. 2A.

An electric cable assembly 210 for a human-powered vehicle in accordance with a second embodiment will be described below referring to FIGS. 2A and 2B. The electric cable assembly 210 has the same configuration as the electric cable assembly 10 of the first embodiment except for the coupling member. Thus, elements having substantially the same functions as those in the above embodiments will be numbered the same here, and will not be described and/or illustrated again in detail here for the sake of brevity. In this embodiment, the receiving part 30 of the coupling member 16 includes a trench 212 defined by two walls 214, 216. The trench 212 is located on the first surface 34 of the coupling portion 28 and faces outwardly. The wire 20 is located in the respective trenches 212 and arranged between the two opposing walls 214, 216. The trench 212 can also be formed on the receiving part 48 of the additional coupling portion 46 and is not further described.

Furthermore, the shape of the additional receiving parts 32 and 68 of the coupling portion 28 in this embodiment is different from that of the additional receiving parts 32 and 68 recited in the first embodiment. In this embodiment, each of the additional receiving parts 32 and 68 has a first portion 218, a second portion 220 and a third portion 222 connected in series. The first portion 218 extends from a side of the trench 212. The second portion 220 extends towards the additional coupling portion 46 and perpendicular to the first portion 218 and the third portion 222. The third portion 222 extends from the second portion 220 and is substantially parallel to the first portion 218. Each of the legs 62 and 70 is arranged between the corresponding first portion 218 and third portion 222. Moreover, a segment of the third portion 222 can be pressed towards the first portion 218 to be tightly fitted with each leg 62 and 70 for further securing the coupling between the connector 14 and 66 and the coupling portion 28.

The structure of the additional receiving parts 50 and 52 of the additional coupling portion 46 is substantially the same as that of the additional receiving parts 32 and 68 of the coupling portion 28 and thus is not further described.

Third Embodiment

Figure 3:
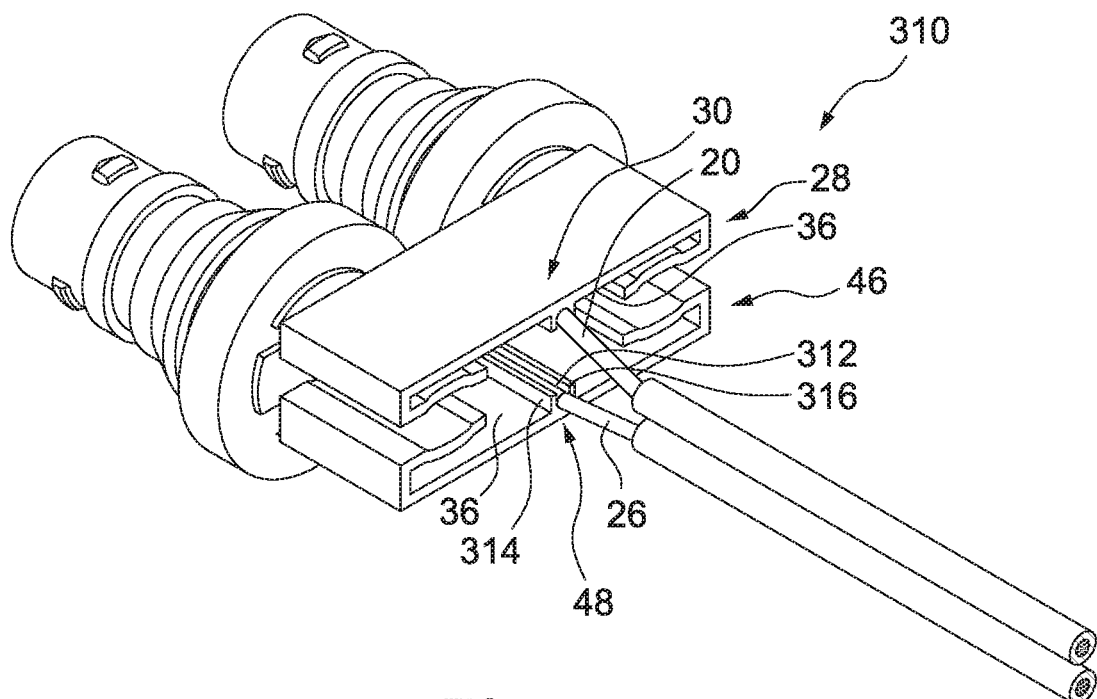
FIG. 3 is a perspective view of an electric cable assembly for human-powered vehicle in accordance with a third embodiment in which a molded part is omitted.

An electric cable assembly 310 for a human-powered vehicle in accordance with a third embodiment will be described below referring to FIG. 3. The electric cable assembly 310 has the same configuration as the electric cable assembly 210 shown in FIG. 2 except for the coupling member. Thus, elements having substantially the same function as those in the above embodiments will be numbered the same here, and will not be described and/or illustrated again in detail here for the sake of brevity. In this embodiment, each of the receiving parts 30, 48 includes a trench 312 defined by two opposing walls 314, 316. The trench 312 is located on the second surface 36 of each of the coupling portion 28 and the additional coupling portion 46, respectively to inwardly face each other. The wire 20 and the additional wire 26 are located in the respective trenches 312 and arranged within the two opposing walls 314, 316.

Fourth Embodiment

Figure 4:
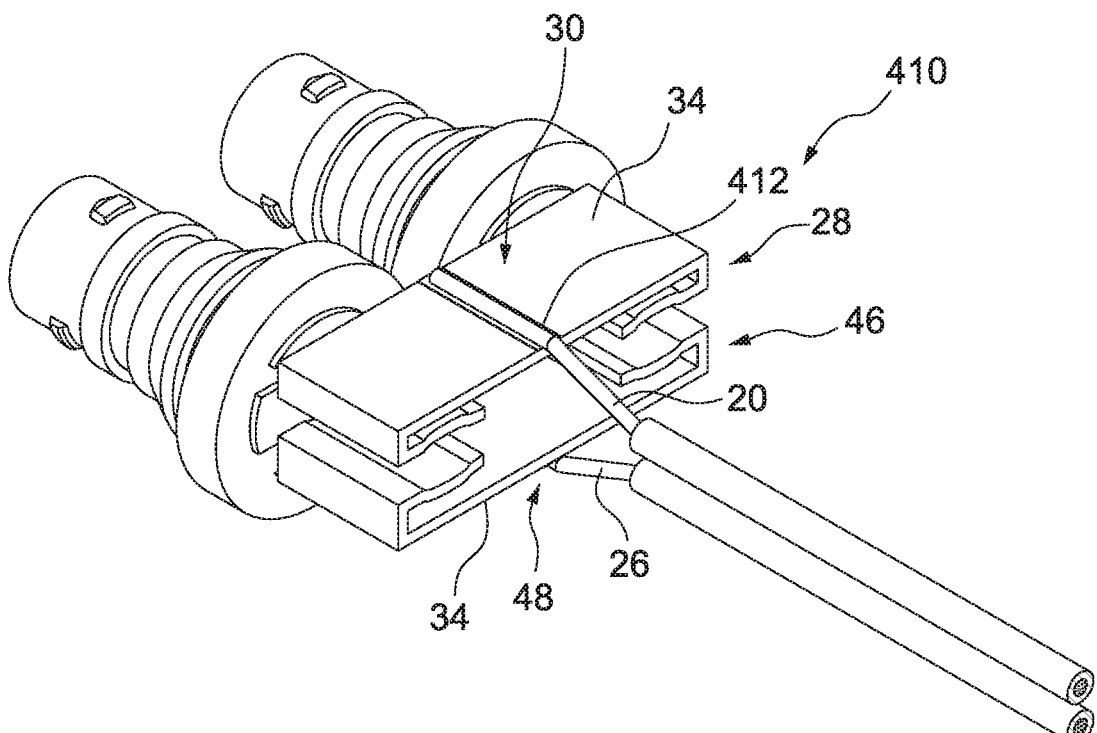
FIG. 4 is a perspective view of an electric cable assembly for human-powered vehicle in accordance with a fourth embodiment in which a molded part is omitted.

An electric cable assembly 410 for a human-powered vehicle in accordance with a fourth embodiment will be described below referring to FIG. 4. The electric cable assembly 410 has the same configuration as the electric cable assembly 210 shown in FIG. 2 except for the coupling member. Thus, elements having substantially the same function as those in the above embodiments will be numbered the same here, and will not be described and/or illustrated again in detail here for the sake of brevity. In this embodiment, each of the receiving parts 30, 48 has the first surface 34 which is substantially flat and which faces outwardly. The wire 20 and the additional wire 26 are disposed on the first surfaces 34. In this embodiment, an adhesive 412 can be applied to the wire 20 and the first surface 34 of the coupling portion 28 for enhancing the fixation of the wire 20. Similarly, the adhesive 412 can be applied to the additional wire 26 and the first surface 34 of the additional coupling portion 46 for achieving more reliable fixing of the additional wire 26.

Fifth Embodiment

Figure 5A:
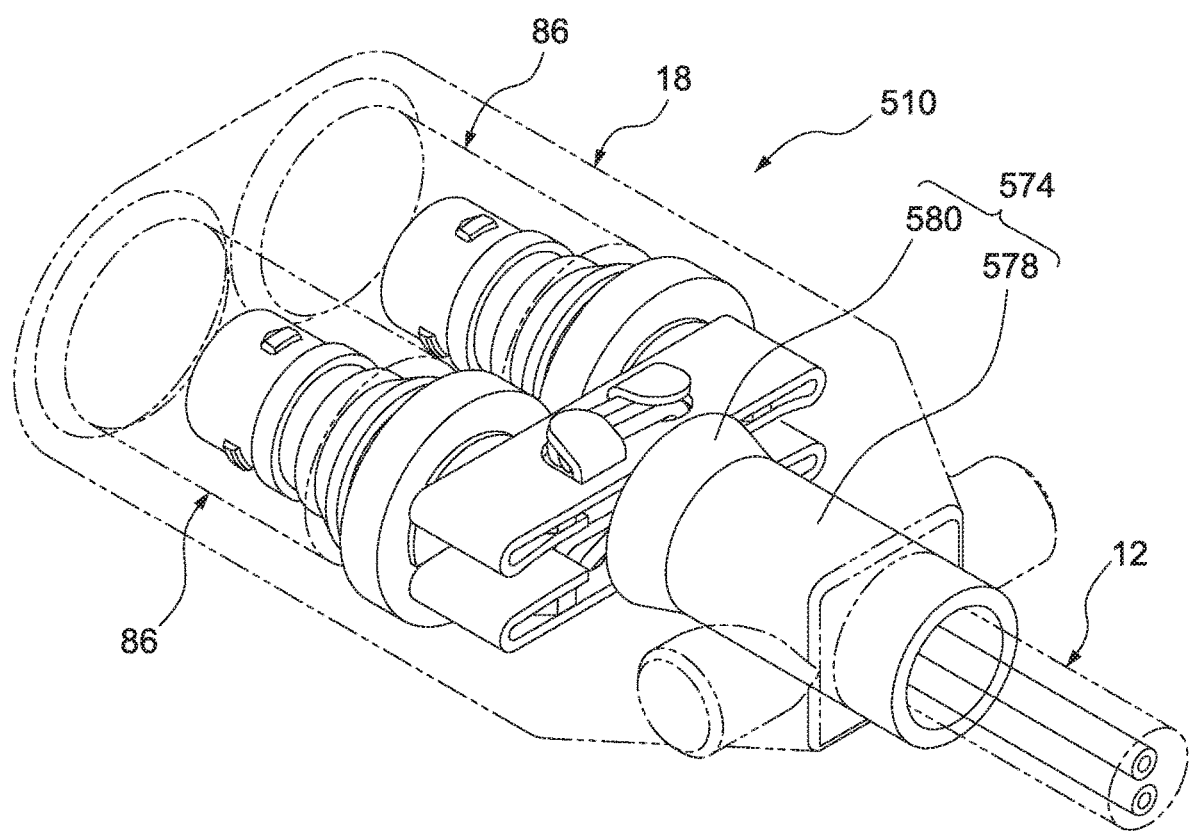
FIG. 5A is a perspective view of an electric cable assembly for a human-powered vehicle in accordance with a fifth embodiment in which a molded part is omitted.
Figure 5B:
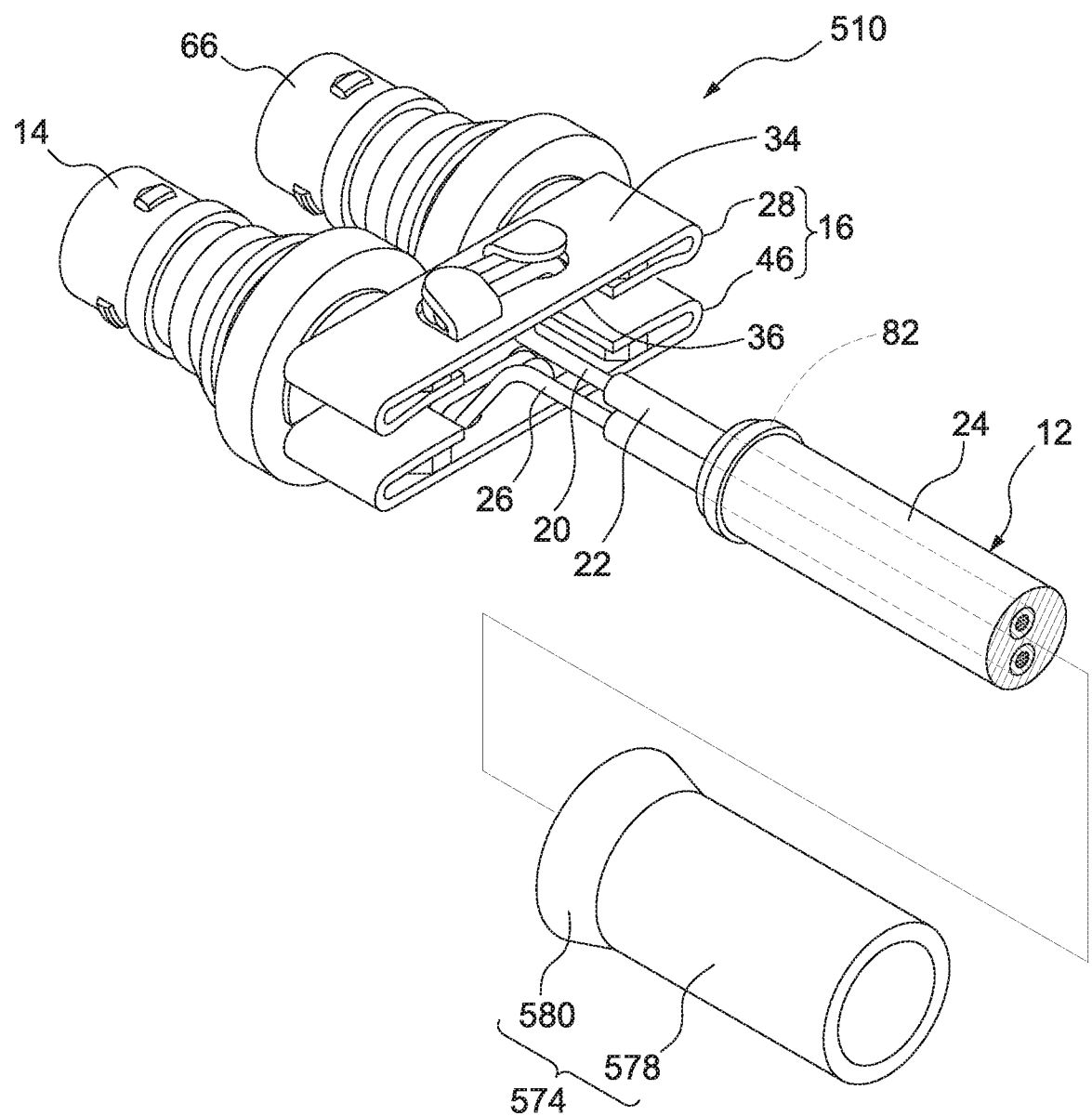
FIG. 5B is an exploded view of the electric cable assembly of FIG. 5A in which a molded part is omitted.

An electric cable assembly 510 for a human-powered vehicle in accordance with a fifth embodiment will be described below referring to FIGS. 5A and 5B. The electric cable assembly 510 has the same configuration as the electric cable assembly 10 shown in FIG. 1 except for the holder 574. Thus, elements having substantially the same function as those in the above embodiments will be numbered the same here, and will not be described and/or illustrated again in detail here for the sake of brevity. In this embodiment, the holder 574 includes a tapered portion 580 that expands towards the coupling member 16 so as to position the coupling member 16 between the holder 574 and the connectors 14, 66. Moreover, the holder 574 also includes an annular portion 578 that extends further towards the coupling member 16, and a part of the annular portion 578 is accommodated in the molded part 18.

Sixth Embodiment

Figure 6A:
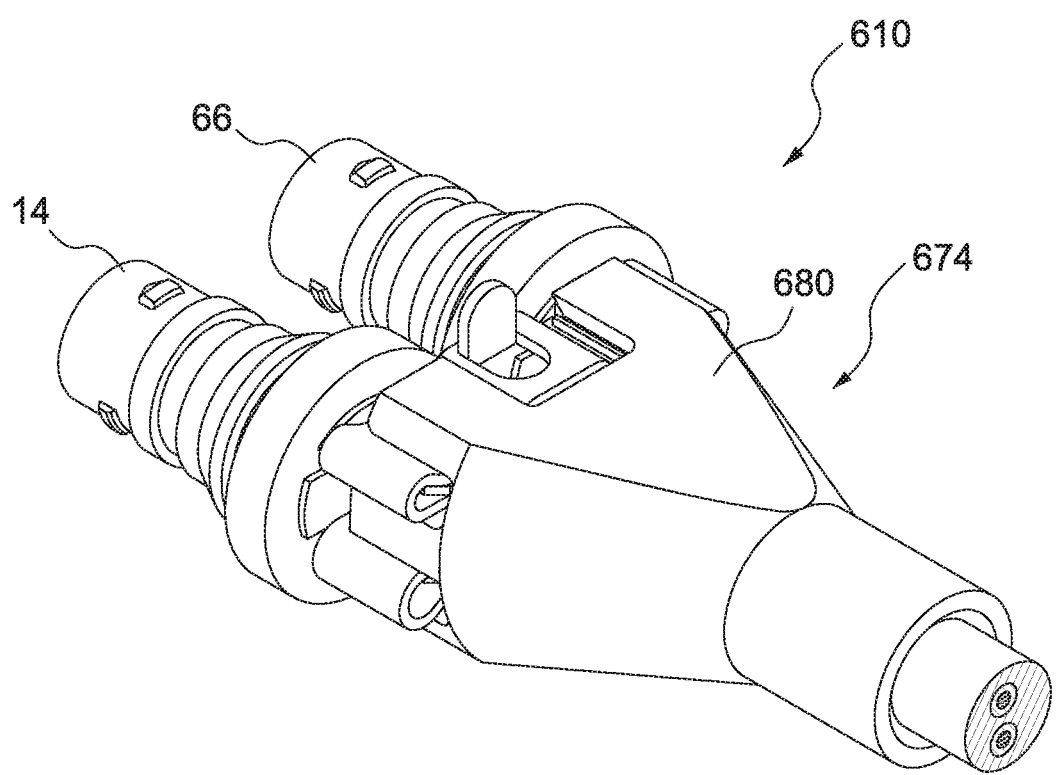
FIG. 6A is a perspective view of an electric cable assembly for human-powered vehicle in accordance with a sixth embodiment in which a molded part is omitted.
Figure 6B:
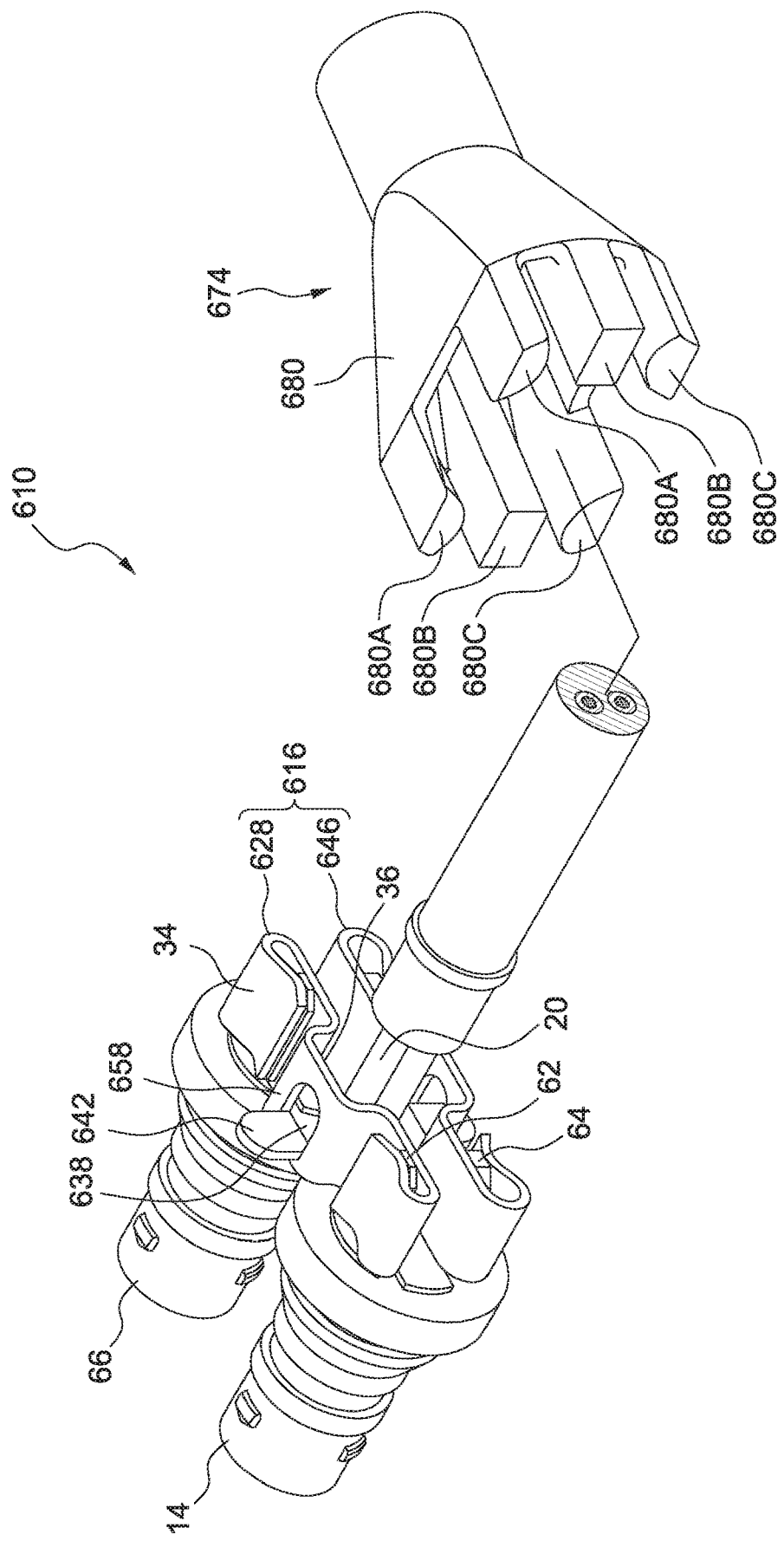
FIG. 6B is an exploded view of the electric cable assembly of FIG. 6A.

An electric cable assembly 610 for a human-powered vehicle in accordance with a fifth embodiment will be described below referring to FIGS. 6A and 6B. The electric cable assembly 610 has the same configuration as the electric cable assembly 510 shown in FIGS. 5A and 5B except for the holder 674 and coupling member 616. Thus, elements having substantially the same function as those in the above embodiments will be numbered the same here, and will not be described and/or illustrated again in detail here for the sake of brevity. In this embodiment, the holder 674 includes a tapered portion 680 that expands towards the coupling member 616 so as to position the coupling member 616 between the holder 674 and the connectors 14, 66. The holder 674, including the tapered portion 680, is formed of an insulated material. The tapered portion 680 includes at least a protrusion 680A, 680B, 680C disposed on at least a coupling portion. More specifically, the tapered portion 680 includes protrusions 680A, 680B, 680C that are disposed on the first surface 34 and second surface 36 of each coupling portions 628, 646. The protrusions 680A, 680B, 680C are configured to fix and position the coupling portions 628, 646 of the coupling member 616 to be relatively apart, so as to prevent any contact between the coupling portions 628, 646. In addition, the coupling portions 628 are positioned between the protrusions 680A and the protrusions 680B. The coupling portions 646 are positioned between the protrusions 680B and the protrusions 680C. The shapes of the protrusions 680A, 680B, 680C corresponds to the shapes of the respective portions of the coupling portions 628, 646. Each of the coupling portions 628, 646, has a different structure. Preferably, each of the coupling portions 628, 646 has a different thickness to efficiently accommodate the legs 62, 64 of the connectors. Furthermore, each of the coupling portions 628, 646 has one receiving part 658 which comprises an aperture 638 and a holding portion 642. Similar to the embodiment shown in FIGS. 1A and 1B, the wire 20 is coupled to the receiving part 658 through the aperture 638. The holding portion 642 protruding from the coupling portion 628 can be pressed towards the receiving part 658 to position and hold the wire 20.

Modifications

Figure 7A:
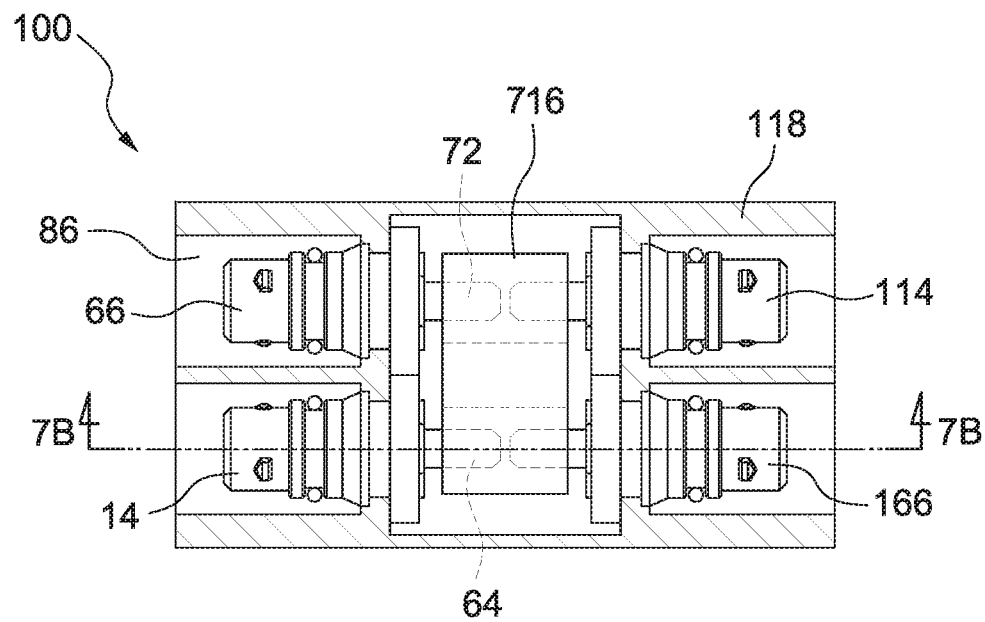
FIG. 7A is a top cross-sectional view of a modification of an electrical cable assembly taken along line 7A-7A in FIG. 7B, in which the connectors remain intact.
Figure 7B:
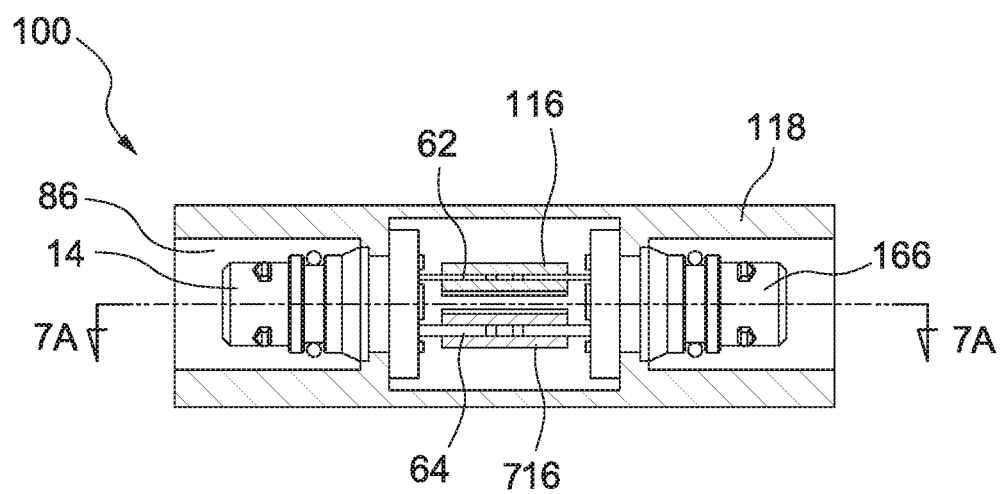
FIG. 7B is a front cross-sectional view of the electrical cable assembly taken along line 7B-7B in FIG. 7A, in which the connectors remain intact.

In the first to sixth embodiment, an electric cable assembly for a human-powered vehicle is provided and comprises an electric cable 12, a connector 14, an additional connector 66, a coupling member 16 and a molded part 18. However, the electrical cable assembly is not limited to this embodiment. For example, the electric cable can be omitted from a junction adapter 100 that is configured to connect bicycle components. As seen in FIGS. 7A and 7B, a pair of connectors 14, 66 is coupled to the coupling members 116, 716, and an additional pair of connectors 114, 166 is coupled to the coupling member 116, 716 in an opposite direction to the coupling members 116, 716 respectively. The coupling members 116, 716 can be modified to be bigger to accommodate the connectors 14, 66, 114, 166. The assembled part of the connectors 14, 66, 114, 166 and the coupling members 116, 716 are accommodated in a molded part 118. Each of the connectors is exposed by the corresponding recesses 86 that are configured to respectively accommodate parts of the connectors 14,114 and the additional connectors 66,166, i.e., receptacles of the connectors 14, 114 and the additional connectors 66, 166. In addition, it should be noted that the shapes and numbers of the connectors and coupling members are not limited to this embodiment and can be modified as needed and/or desired.

In the first to sixth embodiments, the electric cable assembly for a human-powered vehicle is provided to connect at least one electric component located on the human-powered vehicle. However, the electric cable assembly can be modified to include a control circuit or a wireless communication unit. In such embodiments, the electric cable assembly can be used to process or transmit control signals between electric components.

It will be apparent to those skilled in the bicycle field from the present disclosure that the above embodiments can be at least partly combined with each other if needed or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meaning, for example, a particular order or the like. Moreover, for example, the term "first element" itself does not imply an existence of a "second element," and the term "second element" itself does not imply an existence of a "first element."

The term "pair of," as used herein, can encompass the configuration in which the pair of elements have different shapes or structures from each other in addition to the configuration in which the pair of elements have the same shapes or structures as each other. The terms "a" (or "an"), "one or more" and "at least one" can be used interchangeably herein. The phrase "at least one of" as used in the present application means "one or more" of a desired choice. For one example, the phrase "at least one of" as used in the present application means "only one single choice" or "both of two choices" if the number of its choices is two. For another example, the phrase "at least one of" as used in the present application means "only one single choice" or "any combination of equal to or more than two choices" if the number of its choices is equal to or more than three.

Finally, terms of degree such as "substantially," "about" and "approximately" as used herein mean a reasonable amount of deviation of the modified term such that the end result is not significantly changed. All numerical values described in the present application can be construed as including the terms such as "substantially," "about" and "approximately."

Obviously, numerous modifications and variations of the present invention are possible in light of the above teachings. It is therefore to be understood that within the scope of the appended claims, the present invention may be practiced otherwise than as specifically described herein.

What is claimed is:

1. An electric cable assembly for a human-powered vehicle, the electric cable assembly comprising:
   an electric cable including at least a wire and an additional wire, the wire extending from a first receptacle of an insulated portion, the additional wire extending from a second receptacle of the insulated portion;
   a connector;
   a coupling member electrically coupling the wire to the connector; and
   a molded part integrally accommodating at least part of the insulated portion, at least part of the connector, and the coupling member.

2. The electric cable assembly according to claim 1, wherein
   the coupling member includes a coupling portion; and
   the coupling portion has a receiving part and an additional receiving part, the receiving part receives the wire and the additional receiving part receives the connector, the additional receiving part being spaced apart from the receiving part.

3. The electric cable assembly according to claim 2, wherein
   the coupling member further includes an additional coupling portion spaced apart from the coupling portion; and
   the additional coupling portion has a receiving part and an additional receiving part, the receiving part of the additional coupling portion receives the additional wire and the additional receiving part of the additional coupling portion receives the connector, the additional receiving part of the additional coupling portion being spaced apart from the receiving part of the additional coupling portion.

4. The electric cable assembly according to claim 1, comprising:
   an additional connector;
   the coupling member electrically couples the wire to the additional connector; and
   the molded part integrally accommodates at least part of the additional connector.

5. The electric cable assembly according to claim 4, wherein
   the coupling member includes a coupling portion; and
   the coupling portion has a receiving part and an additional receiving part, the receiving part receives the wire and the additional receiving part receives the connector, the additional receiving part being spaced apart from the receiving part.

6. The electric cable assembly according to claim 5, wherein
   the coupling member further includes an additional coupling portion spaced apart from the coupling portion; and
   the additional coupling portion has a receiving part and an additional receiving part, the receiving part of the additional coupling portion receives the additional wire and the additional receiving part of the additional coupling receives the connector, the additional receiving part of the additional coupling portion being spaced apart from the receiving part of the additional coupling portion.

7. The electric cable assembly according to claim 5, further comprising
   a holder that positions an end portion of the insulated portion with respect to the molded part.

8. The electric cable assembly according to claim 7, wherein
   the holder includes a cover member that covers the end portion of the insulated portion.

9. The electric cable assembly according to claim 8, wherein
   the holder further includes a positioning member that positions the cover member with respect to the end portion of the insulated portion.

10. The electric cable assembly according to claim 9, wherein
    the positioning member is fixedly disposed on an outer circumferential surface of the insulated portion.

11. The electric cable assembly according to claim 8, wherein
    the cover member includes an annular portion and a tapered portion extending from one end of the annular portion towards the molded part.

12. The electric cable assembly according to claim 11, wherein
    the tapered portion is configured to be accommodated in the molded pan.

13. The electric cable assembly according to claim 5, wherein
the molded part includes a recess that arranges a part of the connector such that the connector is electrically connected to an electric component.

14. The electric cable assembly according to claim 5, wherein
the molded part is a low pressure molded part.

15. The electric cable assembly according to claim 5, wherein
the molded part is made of an insulating material.

16. An electric cable assembly for a human-powered vehicle, the electric cable assembly comprising:
an electric cable assembly for a human-powered vehicle the electric cable asset assembly comprising:
an electric cable including at least a wire extending from an insulated portion;
a connector;
a coupling member electrically coupling the wire to the connector; and
a molded part integrally accommodating at least part of the insulated portion, at least part of the connector, and the coupling member,
the coupling member further includes an additional coupling portion spaced apart from the coupling portion; and
the additional coupling portion has a receiving part and an additional receiving part, the receiving part receives the additional wire and the additional receiving part receives the connector, the additional receiving part of the additional coupling portion being spaced apart from the receiving part of the additional coupling portion,
the connector including a pair of legs,
the additional receiving part of the coupling portion receiving one of the pair of legs, and
the additional receiving part of the additional coupling portion receiving the other of the pair of legs.

17. A electric cable assembly for a human-powered vehicle, the electric cable assembly comprising:
an electric cable including at least a wire extending from an insulated portion;
a connector;
a coupling member electrically coupling the wire to the connector;
an additional connector; and
a molded part integrally accommodating at least part of the insulated portion, at east part of the connector, and the coupling member,
the coupling member electrically couples the wire to the additional connector,
the molded part integrally accommodates at least part of the additional connector,
the coupling member includes a coupling portion, the coupling portion has a receiving dart and an additional receiving part, the receiving part receives the wire and the additional receiving part receives the connector, the additional receiving part being, spaced apart from the receiving part,
the coupling member further includes an additional coupling portion spaced apart from the coupling portion,
the additional coupling portion has a receiving and an additional receiving part, the receiving part of the additional coupling portion receives the additional wire and the additional receiving part of the additional coupling portion receives the connector the additional receiving part of the additional coupling portion being, spaced apart from the receiving part of the additional coupling portion,
the additional connector includes a pair of legs, the additional receiving part of the coupling portion receives one of the pair of legs, and the additional receiving part of the additional coupling portion receives the other of the pair of legs.

18. A electric cable assembly for a human-powered vehicle, the electric cable assembly comprising:
an electric cable including at least a wire extending from an insulated portion;
a connector;
a coupling member electrically coupling the wire to the connector;
a molded part integrally accommodating at least part of the insulated portion, at least part of the connector, and the coupling member; and
a holder that positions an end portion of the insulated portion with respect to the molded part, the holder includes a cover member that covers the end portion of the insulated portion,
the cover member includes an annular portion and a tapered portion extending from one end of the annular portion towards the molded part, the tapered portion includes at least a protrusion disposed on at least a coupling portion.

19. An electric cable assembly for human-powered vehicle, the electric cable assembly comprising:
an electric cable including at least a wire and an additional wire, the wire extending from a first receptacle of an insulated portion, the additional wire extending from a second receptacle of the insulated portion;
a connector;
an additional connector; and
a molded part integrally accommodating at least part of the insulated portion, at least part of the connector and at least part of the additional connector, such that the connector and additional connector are electrically coupled to the wire in the molded part.

20. An electric cable assembly for a human-powered vehicle, the electric cable assembly comprising:
an electric cable including at least a wire extending from an insulated portion;
a connector;
a coupling member electrically coupling the wire to the connector by a solderless connection; and
a molded part integrally accommodating at least part of the insulated portion, at least part of the connector, and the coupling member.

* * * * *